United States Patent
Miyazawa

(10) Patent No.: US 9,996,312 B2
(45) Date of Patent: Jun. 12, 2018

(54) DISPLAY DRIVER, DISPLAY SYSTEM AND MICROCOMPUTER

(71) Applicant: Synaptics Japan GK, Tokyo (JP)

(72) Inventor: Kei Miyazawa, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 748 days.

(21) Appl. No.: 14/532,233

(22) Filed: Nov. 4, 2014

(65) Prior Publication Data
US 2015/0130862 A1 May 14, 2015

(30) Foreign Application Priority Data
Nov. 11, 2013 (JP) .................. 2013-232887

(51) Int. Cl.
G06F 3/147 (2006.01)
G09G 3/20 (2006.01)
G09G 3/36 (2006.01)

(52) U.S. Cl.
CPC .......... *G06F 3/147* (2013.01); *G09G 3/2096* (2013.01); *G09G 3/3648* (2013.01); *G09G 2310/08* (2013.01); *G09G 2330/021* (2013.01); *G09G 2340/0435* (2013.01)

(58) Field of Classification Search
CPC .... G06F 3/147; G09G 3/2096; G09G 3/3648; G09G 2310/08; G09G 2330/021; G09G 2340/0435
USPC .......................................... 345/691
See application file for complete search history.

(56) References Cited

U.S. PATENT DOCUMENTS

| 5,821,924 A * | 10/1998 | Kikinis | G03G 15/2003 345/212 |
| 2010/0073343 A1* | 3/2010 | Shingai | G09G 3/3629 345/210 |
| 2010/0097365 A1* | 4/2010 | Fang | G09G 3/3648 345/212 |

(Continued)

FOREIGN PATENT DOCUMENTS

| WO | WO-2009011010 A1 | 1/2009 |
| WO | 2012137761 A1 | 10/2012 |

OTHER PUBLICATIONS

Chinese Application No. 201410645779.2, Chinese Office Action dated Apr. 3, 2018 consists of 11 pages, the reference table therein offered as a consise statement of relevance.

*Primary Examiner* — Kent Chang
*Assistant Examiner* — Mark Edwards
(74) *Attorney, Agent, or Firm* — Patterson + Sheridan, LLP

(57) ABSTRACT

Low power consumption is realized focusing on the refresh interval of a low leakage display panel. Display systems and microcomputers are described herein. One embodiment of a display system includes a display driver. The driver receives an enable signal from the outside, stops the display operation of an internal circuit in an inactive state of the enable signal, and resumes the display operation of the internal circuit in an active state. Instead of the enable signal, a command supplied from the outside may be used. When resuming the display operation, the display driver performs control to make the start timing of the display operation earlier for a circuit that requires a long time for activation. A microcomputer that outputs an enable signal or a command controls the output or the output stop of display data according to the state of the enable signal or the command.

15 Claims, 7 Drawing Sheets

(56) References Cited

U.S. PATENT DOCUMENTS

| | | | |
|---|---|---|---|
| 2010/0156928 A1* | 6/2010 | Lee | G09G 3/2096 345/589 |
| 2012/0169751 A1* | 7/2012 | Yamamoto | G02F 1/13624 345/531 |
| 2014/0022231 A1 | 1/2014 | Saitoh et al. | |
| 2015/0243253 A1* | 8/2015 | Sone | G09G 3/2096 345/209 |

* cited by examiner

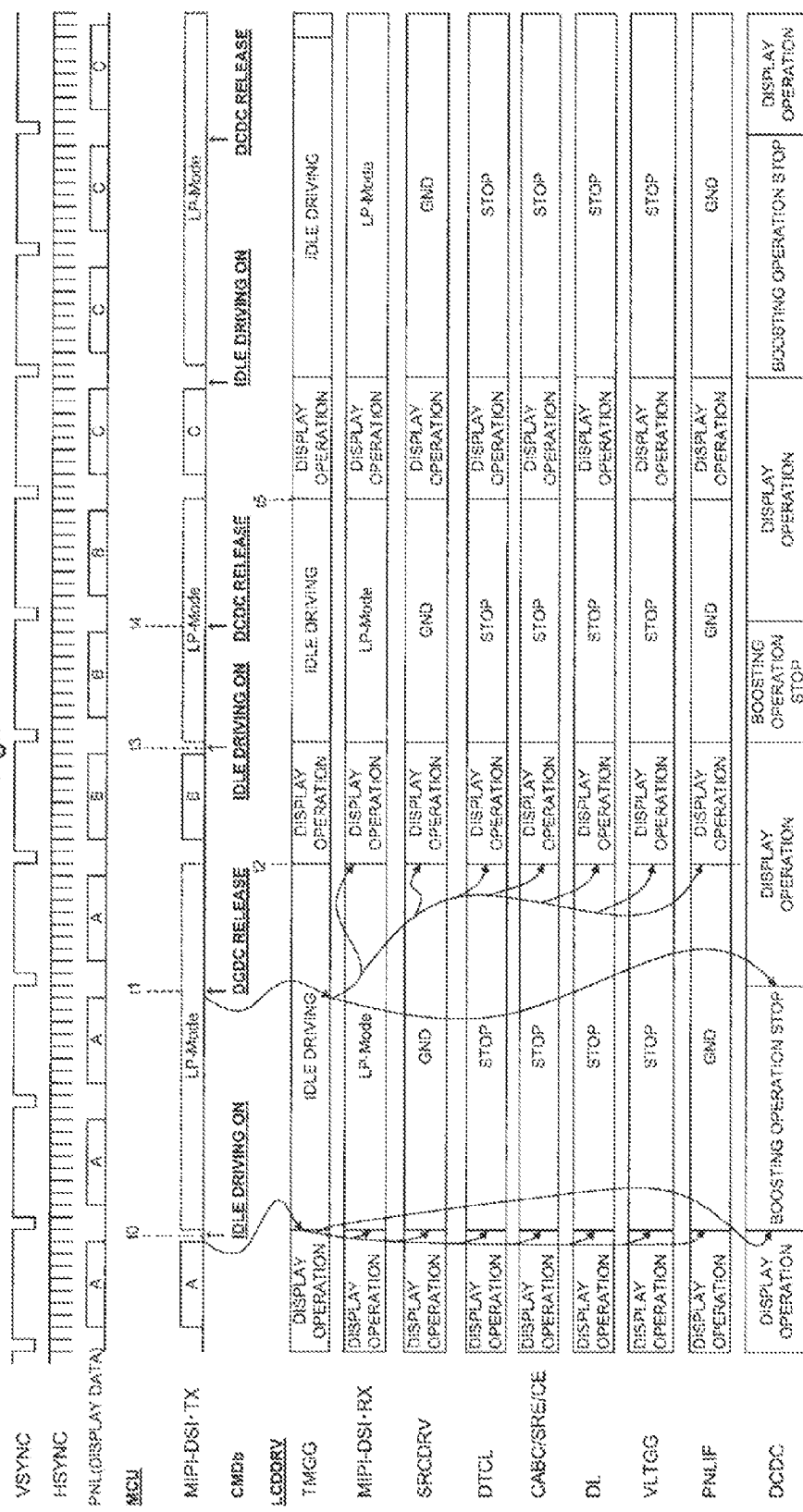

DISPLAY DRIVER, DISPLAY SYSTEM AND MICROCOMPUTER

CROSS-REFERENCE TO RELATED APPLICATIONS

The present application claims priority from Japanese application JP 2013-232887 filed on Nov. 11, 2013, the content of which is hereby incorporated by reference into this application.

BACKGROUND

The present invention relates to a display driver, a display system that drives a display panel using a display driver, and a microcomputer that controls a display driver, and in particular, to a technique that is effectively applied to a liquid crystal display driver that is effective for the driving of a so-called "low leakage" liquid crystal display panel having a low leakage characteristic for the display charge, for example.

In order to increase the battery life in a portable information terminal, power reduction across the entire system is important. For this reason, a low leakage liquid crystal display panel has been developed. In the case of a still image, even if the low leakage liquid crystal display panel is not refreshed in each frame as conventionally known, it is possible to hold the display charge on the low leakage liquid crystal display panel side.

If a liquid crystal display driver used to drive the liquid crystal display panel includes a frame buffer that is a random access memory (RAM), a host processor holds static display data of one frame in the frame buffer. Therefore, even if the supply of still image data is stopped thereafter, the liquid crystal display driver can continue to supply a display signal to the liquid crystal display panel by repeatedly reading the still image data from the frame buffer memory. Accordingly, when driving the low leakage liquid crystal display panel, the liquid crystal display driver does not need to read the still image data from the frame buffer memory for each display frame. As a result, less power consumption is realized.

On the other hand, a liquid crystal display driver corresponding to a video mode in which no frame buffer memory is provided operates on the assumption that the transmission of display data of a still image is always received similar to a moving image. This is because there is no buffer function of display data. When attention is paid to the display of still image data, display data is transmitted regardless of panel refreshing, and the panel refreshing is performed in each frame by the transmitted display data. Under such circumstances, in order to reduce the number of times the panel is refreshed when displaying a still image on the low leakage liquid crystal display panel, a number of techniques may be utilized. For example, by performing a checksum for input display data in units of a frame, it may be determined on the liquid crystal display driver side whether or not the display data is a still image according to whether or not there has been an image change between front and rear display frames. When it is determined that the display data is a still image, it is preferable to increase the panel refresh interval according to the characteristics of the low leakage liquid crystal display panel.

An additional technique disclosed in WO 2012/137761 A1. WO 2012/137761 A1 abstractly describes that a scan period, for which a driving signal is supplied to a signal electrode based on a synchronization signal or a clock signal supplied from the outside, and a non-scan period, for which no driving signal is supplied to a signal electrode of a pixel, are generated by a timing controller, but does not provide a teaching of how to enable such a system. In short, WO 2012/137761 A1 just simply describes using a clock or a synchronization signal from the host side for the control of a panel refresh period and an idle driving period.

However, even when using the checksum described above, if the host processor continues the transmission of display data for each frame, useless power consumption occurs on the host processor side. Since such a checksum is performed in units of a frame, an identification frame of one frame is required at the time of switching from the still image to the moving image and at the time of switching from the idle driving to the normal operation. When performing a checksum using the identification frame, the display operation is stopped. Accordingly, the display data of one frame at the time of switching is unnecessary data that is only used for a comparison, and this increases the amount of data.

Even when a timing controller is used, a host processor that controls the transmission and reception of display data is always in the transmission operation state. Accordingly, low power consumption on the host processor side is not realized.

SUMMARY

Low power consumption is realized focusing on the refresh interval of a low leakage display panel. Display systems and microcomputers are described herein. One embodiment of a display system includes a display driver. The display system includes an input interface circuit, a timing generating circuit and first and second circuits. The input interface circuit is configured to receive display data and a synchronization signal. The timing generating circuit is configured to generate an internal timing signal in synchronization with the synchronization signal. The first and second circuits are configured to generate and output, respectively, a signal supplied to a scan line of a display panel and a signal supplied to a signal line of the display panel, using the display data input from the input interface circuit. The first and second circuits are configured to perform a display operation controlled by the internal timing signal. The second circuit includes a circuit having a long activation time compared with an activation time of the first circuit. The timing generating circuit is configured to, upon receipt of an enable signal, stop a display operation of the input interface circuit and the first and second circuits in response to an inactive state of the enable signal, and resume the display operation of the input interface circuit and the first and second circuits in response to an active state of the enable signal. The display operation of the second circuit is configured to resume in response to the active state of the enable signal earlier than the display operation of the input interface circuit and the first circuit in response to the active state of the enable signal by a predetermined time.

In another embodiment, a microcomputer is provided that includes an output interface circuit, an output port, and a control circuit. The output interface circuit is configured to output display data and a synchronization signal. The output port is configured to output an enable signal. The control circuit is configured to control an output operation of the output interface circuit and an output operation of the output port. The control circuit is configured to refresh a gradation signal held in a liquid crystal element of a display panel at predetermined intervals by repeating an operation of stopping an output of still image data from the output interface circuit by changing the enable signal to an inactive state and then resuming the output of the still image data by changing the enable signal to an active state at the predetermined intervals.

In another embodiment, a display system is provided that includes an input interface circuit, a timing generating circuit, and first and second circuits. The input interface circuit is configured to receive a synchronization signal, display data, and a command. The timing generating circuit is configured to generate an internal timing signal in synchronization with the synchronization signal. The first and second circuits are configured to generate and output, respectively, a signal supplied to a scan line of a display panel and a signal supplied to a signal line of the display panel, using the display data input from the input interface circuit, the first and second circuits configured to perform a display operation controlled by the internal timing signal. The second circuit includes a circuit having a long activation time compared with an activation time of the first circuit. The timing generating circuit is configured to receive a control command input from the input interface circuit, stop a display operation of the input interface circuit and the first and second circuits in response to a first state of the control command, resume the display operation of the second circuit in response to a second state of the control command, and resume the display operation of the input interface circuit and the first circuit in response to a third state of the control command.

In another embodiment, a microcomputer is provided that includes an output interface circuit and a control circuit. The output interface circuit is configured to output a synchronization signal, display data, and a control command. The control circuit is configured to control an output operation of the output interface circuit. The control circuit is configured to refresh a gradation signal held in a liquid crystal element of a display panel at predetermined intervals by repeating an operation of stopping an output of still image data from the output interface circuit by changing the control command to a first state and then resuming a supply of the still image data after a transition of the control command to a third state from a transition of the control command to a second state at the predetermined intervals.

In another embodiment, a display system is provided that includes an input interface circuit, a timing generating circuit, and first and second circuits. The input interface circuit is configured to receive a synchronization signal, display data, and a command. The timing generating circuit is configured to generate an internal timing signal in synchronization with the synchronization signal. The first and second circuits are configured to generate and output, respectively, a signal supplied to a scan line of a display panel and a signal supplied to a signal line of the display panel, using the display data input from the input interface circuit. The first and second circuits are configured to perform a display operation controlled by the internal timing signal, wherein the second circuit includes a circuit having a long activation time compared with an activation time of the first circuit. The timing generating circuit is configured to receive a control command input from the input interface circuit, stop a display operation of the input interface circuit and the first and second circuits in response to a first state of the control command, and resume the display operation of the first and second circuits in response to a second state of the control command. The display operation of the second circuit is configured to resume in response to the second state of the control command earlier than the display operation of the input interface circuit and the first circuit in response to the second state of the control command by a predetermined time.

In another embodiment, a microcomputer is provided that includes an output interface circuit, and a control circuit. The output interface circuit is configured to output a synchronization signal, display data, and a control command. The control circuit is configured to control an output operation of the output interface circuit. The control circuit is configured to refresh a gradation signal held in a liquid crystal element of a display panel at predetermined intervals by repeating an operation of stopping an output of still image data from the output interface circuit by changing the control command to a first state and then resuming a supply of the still image data by changing the control command to a second state at the predetermined intervals.

BRIEF DESCRIPTION OF THE DRAWINGS

FIG. 7 is a timing chart illustrating the operation timing of still image display driving for a low leakage liquid crystal display panel by the display driver of the third embodiment.

DETAILED DESCRIPTION

1. Introduction

Figure 1:
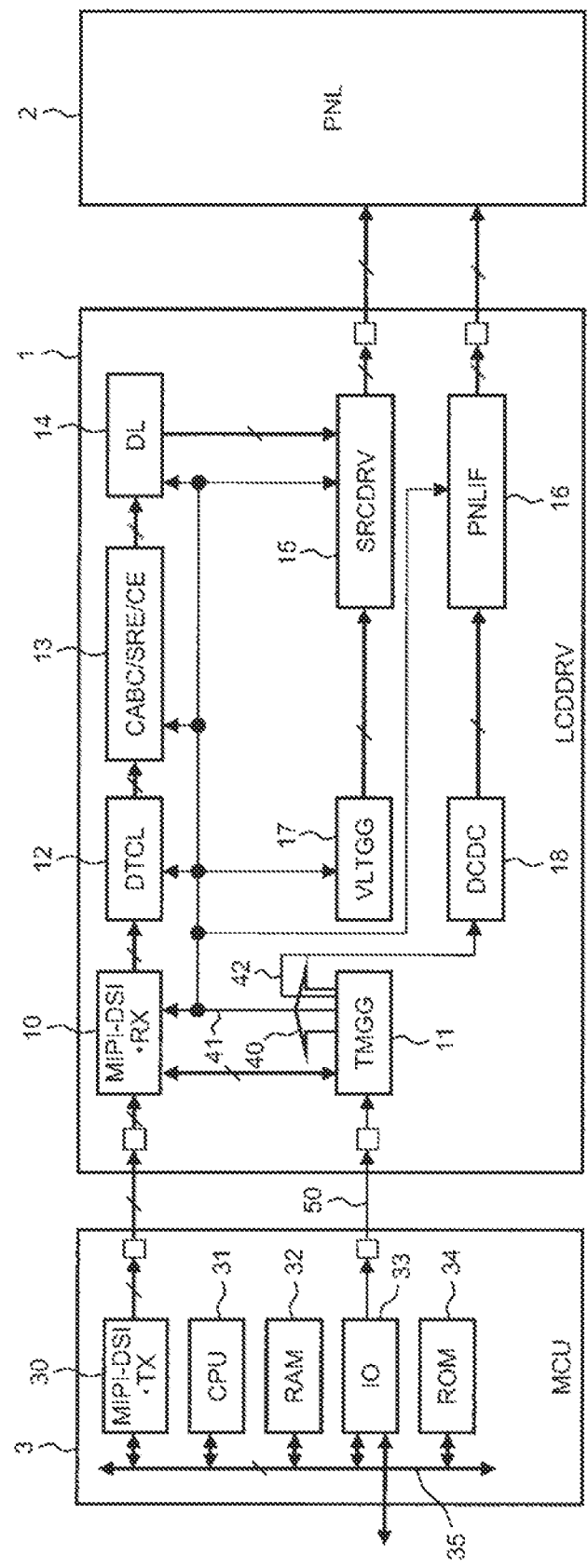
FIG. 1 is a block diagram illustrating a display system using a display driver of a first embodiment corresponding to an enable signal.

However, even when using the checksum described above, if the host processor continues the transmission of display data for each frame, unnecessary power consumption occurs on the host processor side. Since such a checksum is performed in units of a frame, an identification frame of one frame is required at the time of switching from the still image to the moving image and at the time of switching from the idle driving to the normal operation. When performing a checksum using the identification frame, the display operation is stopped. Accordingly, the display data of one frame at the time of switching is unnecessary data that is only used for a comparison, and this increases the amount of data.

Even when a timing controller is used, a host processor that controls the transmission and reception of display data is always in the transmission operation state. Accordingly, low power consumption on the host processor side is not realized.

The above and other novel features will become apparent from the description of this specification and the accompanying diagrams.

The outline of typical embodiments disclosed in this specification will be briefly described as follows.

That is, the display driver receives an enable signal from outside the driver, stops the display operation of the internal circuit in the inactive state of the received enable signal, and resumes the display operation of the internal circuit in the active state. Instead of the enable signal, a command supplied from the outside may be used. When resuming the display operation, the display driver performs control to make the start timing of the display operation earlier for a circuit that requires along time for activation. The microcomputer that outputs an enable signal or a command controls the output of the display data or the output stop according to the state of the enable signal or the command.

Typical embodiments of the disclosure are briefly described as follows.

That is, it is possible to contribute to the realization of low power consumption by focusing on the refresh interval of the low leakage display panel. This is because the display driver can stop the display operation according to an instruction based on an enable signal or a command. In addition, this is because the microcomputer has to supply still image data only when making the display driver perform a display operation according to the enable signal or the command.

2. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Display Driver of a First Embodiment Corresponding to a Display Enable Signal A display driver (1) includes: an input interface circuit (10) that receives display data and a synchronization signal; a timing generating circuit (11) that generates an internal timing signal in synchronization with the synchronization signal; and a first circuit (12 to 17) and a second circuit (18) that generate and output a signal supplied to a scan line of a display panel and a signal supplied to a signal line of the display panel using the display data input from the input interface circuit and that perform a display operation controlled by the internal timing signal. The second circuit includes a circuit having a long activation time compared to the first circuit. For example from a stop of the circuit operation, the second circuit takes longer to begin a circuit operation compared to the first circuit. The timing generating circuit receives an enable signal (50) from outside, stops a display operation of the input interface circuit and the first and second circuits in response to an inactive state of the enable signal, and resumes the display operation of the input interface circuit and the first and second circuits in response to an active state of the enable signal. A start timing of the display operation of the second circuit responding to the active state of the enable signal is earlier than a start timing of the display operation of the input interface circuit and the first circuit responding to the active state of the enable signal by a predetermined time (Td).

In this case, the display driver stops the display operation according to an instruction based on the enable signal. Therefore, this can contribute to the realization of low power consumption focusing on the refresh interval of the low leakage display panel. There is no inconvenience, such as in the case of adopting the checksum. Since the input of the enable signal is independent of the input interface circuit that receives the display data, it is possible to input the enable signal without any interference even during the input of display data.

[2] Specific Examples of the First and Second Circuits

In the above-described [1], the first circuit includes a processing circuit (12, 13) that performs required data processing on the display data input from the input interface circuit, a latch circuit (14) that latches data processed by the processing circuit in units of a scan line, a signal line driving circuit (15) that generates and outputs a gradation signal to the signal line based on the data latched in the latch circuit, a panel interface circuit (16) that outputs a scan driving signal for driving the scan line based on the generated internal timing signal, and a gradation voltage generating circuit (17) that generates a gradation voltage of the gradation signal using an analog amplifier. The second circuit includes a scan driving voltage generating circuit (18) that generates a scan driving voltage of the scan driving signal, which is a higher voltage than the gradation voltage, by a charge pump operation.

In this case, the restart of the operation of the circuit that generates a scan driving voltage by a charge pump can be made to be earlier than the circuit that generates a gradation voltage.

[3] Stop of a Display Operation

In the above-described [2], a stop of a display operation in the input interface circuit is a low power consumption mode in which a transmission speed is low, a stop of a display operation in the processing circuit is a stop of required data processing on the display data, a stop of a display operation in the latch circuit is a full-bit fixed value latch or a stop of a latch operation according to a setting of a control register, a stop of a display operation in the signal line driving circuit is a full-bit fixed value output operation or a stop of an output operation of the gradation signal according to a setting of a control register, a stop of a display operation in the gradation voltage generating circuit is a stop or a continuation of a gradation voltage generating operation according to a setting of a control register, a stop of a display operation in the panel interface circuit is a stop of an output operation of the scan driving signal, and a stop of a display operation in the scan driving voltage generating circuit is a boosting operation stop or a reduction in a boosting clock frequency according to a setting of a control register.

In this case, when the stop of the display operation is instructed, the mode of the stop can be selected according to the setting of the control register. Therefore, the display driver can perform low power consumption control according to the performance or function of the display panel whose display is to be controlled.

[4] Display System

A display system includes: the display driver (1) described in [1]; a display panel (2) in which pixels, in which a liquid crystal display element is connected in series to a switch element using an oxide semiconductor, are arranged in a matrix, a scan line for receiving a scan driving signal output from the display driver is connected to a selection terminal of the switch element, and a signal line for receiving a gradation signal output from the display driver is connected to a signal terminal of the switch element; and a microcomputer (3) that supplies display data to the input interface circuit together with the synchronization signal and outputs an enable signal to the timing generating circuit. When displaying still image data on the display panel, the microcomputer stops a supply of the still image data to the display driver by changing the enable signal to an inactive state and then resumes an output of the still image data at a timing after the second circuit becomes operable from a transition of the enable signal to an active state at intervals between which a gradation signal held in a liquid crystal element of the display panel is to be refreshed.

In this case, when displaying a still image on the low leakage display panel, low power consumption can be realized not only for the display driver but also for the microcomputer. As a result, it is possible to reduce the power consumption of the entire display system using a low leakage display panel.

[5] Microcomputer

A microcomputer (3) includes: an output interface circuit (30) that outputs display data and a synchronization signal; an output port (33) that outputs an enable signal (50); and a control circuit (31) that controls an output operation of the output interface circuit and an output operation of the output port. The control circuit refreshes a gradation signal held in a liquid crystal element of a display panel at predetermined intervals by repeating an operation of stopping an output of still image data from the output interface circuit by changing the enable signal to an inactive state and then resuming the output of the still image data by changing the enable signal to an active state at the predetermined intervals.

In this case, when displaying a still image on the low leakage display panel through the display driver, it is possible to reduce the power consumption required when the microcomputer transmits the display data.

[6] Display Driver of a Second Embodiment Corresponding to a Display Enable Command A display driver (1A) includes: an input interface circuit (10A) that receives a synchronization signal and display data and receives a command; a timing generating circuit (11A) that generates an internal timing signal in synchronization with the synchronization signal; and a first circuit (12 to 17) and a second circuit (18) that generate and output a signal supplied to a scan line of a display panel and a signal supplied to a signal line of the display panel using the display data input from the input interface circuit and that perform a display operation controlled by the internal timing signal. The second circuit includes a circuit having a long activation time until a circuit operation becomes possible from a stop of the circuit operation compared with an activation time of the first circuit. The timing generating circuit receives a control command (CMDa) input from the input interface circuit, stops a display operation of the input interface circuit and the first and second circuits in response to a first state of the control command, resumes the display operation of the second circuit in response to a second state of the control command, and resumes the display operation of the input interface circuit and the first circuit in response to a third state of the control command.

In this case, the display driver stops the display operation according to an instruction based on the command. Therefore, stopping the display operation can contribute to the realization of low power consumption focusing on the refresh interval of the low leakage display panel. Stopping the display operation also removes the need to perform a checksum on the input display data. Since a command is input from the input interface circuit that receives display data, the command should be input during the input idle period of display data, such as a retrace period. However, it is not necessary to add a signal line or an external terminal unlike in the case of the enable signal. In addition, since the restart timing of the display operation of the first and second circuits can be variably determined according to the second and third states of the command, the restart timing of the display operation can be easily adjusted compared with the case of the above-described [1].

[7] Specific Examples of the First and Second Circuits

In the above-described [6], the first circuit includes a processing circuit (12, 13) that performs required data processing on the display data input from the input interface circuit, a latch circuit (14) that latches data processed by the processing circuit in units of a scan line, a signal line driving circuit (15) that generates and outputs a gradation signal to the signal line based on the data latched in the latch circuit, a panel interface circuit (16) that outputs a scan driving signal for driving the scan line based on the generated internal timing signal, and a gradation voltage generating circuit (17) that generates a gradation voltage of the gradation signal. The second circuit includes a scan driving voltage generating circuit (18) that generates a scan driving voltage of the scan driving signal, which is a higher voltage than the gradation voltage, by a charge pump operation.

In this case, the restart of the operation of the circuit that generates a scan driving voltage by a charge pump can be made to be earlier than the circuit that generates a gradation voltage.

[8] Stop of a Display Operation

In the above-described [7], a stop of a display operation in the input interface circuit is a low power consumption mode in which a transmission speed is low, a stop of a display operation in the processing circuit is a stop of required data processing on the display data, a stop of a display operation in the latch circuit is a full-bit fixed value latch or a stop of a latch operation according to a setting of a control register, a stop of a display operation in the signal line driving circuit is a full-bit fixed value output operation or a stop of an output operation of the gradation signal according to a setting of a control register, a stop of a display operation in the gradation voltage generating circuit is a stop or a continuation of a gradation voltage generating operation according to a setting of a control register, a stop of a display operation in the panel interface circuit is a stop of an output operation of the scan driving signal, and a stop of a display operation in the scan driving voltage generating circuit is a boosting operation stop or a reduction in a boosting clock frequency according to a setting of a control register.

In this case, when the stop of the display operation is instructed, the mode of the stop can be selected according to the setting of the control register. Therefore, the display driver can perform low power consumption control according to the performance or function of the display panel whose display is to be controlled.

[9] Display System

A display system includes: the display driver (1A) described in [6]; a display panel (2) in which pixels, in which a liquid crystal display element is connected in series to a switch element using an oxide semiconductor, are arranged in a matrix, a scan line for receiving a scan driving signal output from a panel interface circuit is connected to a selection terminal of the switch element, and a signal line for receiving a gradation signal output from a signal line driving circuit of the display driver is connected to a signal terminal of the switch element; and a microcomputer (3A) that outputs a synchronization signal and display data to the input interface circuit and outputs a control command. When displaying still image data on the display panel, the microcomputer stops a supply of the still image data to the display driver by changing the control command to a first state and then resumes a supply of the still image data after a transition of the control command to a third state from a transition of the control command to a second state at intervals between which a gradation signal held in a liquid crystal element of the display panel is to be refreshed.

In this case, when displaying a still image on the low leakage display panel, low power consumption can be realized not only for the display driver but also for the microcomputer. As a result, it is possible to reduce the power consumption of the entire display system using a low leakage display panel.

[10] Microcomputer

A microcomputer (3A) includes: an output interface circuit (30A) that outputs a synchronization signal and display data and outputs a control command (CMDa); and a control circuit (31A) that controls an output operation of the output interface circuit. The control circuit refreshes a gradation signal held in a liquid crystal element of a display panel at predetermined intervals by repeating an operation of stopping an output of still image data from the output interface circuit by changing the control command to a first state and then resuming a supply of the still image data after a transition of the control command to a third state from a transition of the control command to a second state at the predetermined intervals.

In this case, when displaying a still image on the low leakage display panel through the display driver, it is possible to reduce the power consumption required when the microcomputer transmits the display data.

[11] Display Driver of a Third Embodiment Corresponding to a Display Enable Command A display driver (1B) includes: an input interface circuit (10B) that receives a synchronization signal and display data and receives a command; a timing generating circuit (11B) that generates an internal timing signal in synchronization with the synchronization signal; and a first circuit (12 to 17) and a second circuit (18) that generate and output a signal supplied to a scan line of a display panel and a signal supplied to a signal line of the display panel using the display data input from the input interface circuit and that perform a display operation controlled by the internal timing signal. The second circuit includes a circuit having a long activation time until a circuit operation becomes possible from a stop of the circuit operation compared with an activation time of the first circuit. The timing generating circuit receives a control command (CMDb) input from the input interface circuit, stops a display operation of the input interface circuit and the first and second circuits in response to a first state of the control command, and resumes the display operation of the first and second circuits in response to a second state of the control command. A start timing of the display operation of the second circuit responding to the second state of the control command is earlier than a start timing of the display operation of the input interface circuit and the first circuit responding to the second state of the control command by a predetermined time.

In this case, the display driver stops the display operation according to an instruction based on the command. Therefore, this can contribute to the realization of low power consumption focusing on the refresh interval of the low leakage display panel. Stopping the display operation also removes the need to perform a checksum on the input display data. Since a command is input from the input interface circuit that receives display data, the command should be input during the input idle period of display data, such as a retrace period. However, it is not necessary to add a signal line or an external terminal unlike in the case of the enable signal. In addition, since the display driver determines the restart timing of the display operation of the first and second circuits, the burden of command output processing on the display driver is reduced compared with that in the above-described [6].

[12] Specific Examples of the First and Second Circuits

In the above-described [11], the first circuit includes a processing circuit (12, 13) that performs required data processing on the display data input from the input interface circuit, a latch circuit (14) that latches data processed by the processing circuit in units of a scan line, a signal line driving circuit (15) that generates and outputs a gradation signal to the signal line based on the data latched in the latch circuit, a panel interface circuit (16) that outputs a scan driving signal for driving the scan line based on the generated internal timing signal, and a gradation voltage generating circuit (17) that generates a gradation voltage of the gradation signal. The second circuit includes a scan driving voltage generating circuit (18) that generates a scan driving voltage of the scan driving signal, which is a higher voltage than the gradation voltage, by a charge pump operation.

In this case, the restart of the operation of the circuit that generates a scan driving voltage by a charge pump can be made to be earlier than the circuit that generates a gradation voltage.

[13] Stop of a Display Operation

In the above-described [12], a stop of a display operation in the input interface circuit is a low power consumption mode in which a transmission speed is low, a stop of a display operation in the processing circuit is a stop of required data processing on the display data, a stop of a display operation in the latch circuit is a full-bit fixed value latch or a stop of a latch operation according to a setting of a control register, a stop of a display operation in the signal line driving circuit is a full-bit fixed value output operation or a stop of an output operation of the gradation signal according to a setting of a control register, a stop of a display operation in the gradation voltage generating circuit is a stop or a continuation of a gradation voltage generating operation according to a setting of a control register, a stop of a display operation in the panel interface circuit is a stop of an output operation of the scan driving signal, and a stop of a display operation in the scan driving voltage generating circuit is a boosting operation stop or a reduction in a boosting clock frequency according to a setting of a control register.

In this case, when the stop of the display operation is instructed, the mode of the stop can be selected according to the setting of the control register. Therefore, the display driver can perform low power consumption control according to the performance or function of the display panel whose display is to be controlled.

[14] Display System

A display system includes: the display driver (1B) described in [11]; a display panel (2) in which pixels, in which a liquid crystal display element is connected in series to a switch element using an oxide semiconductor, are arranged in a matrix, a scan line for receiving a scan driving signal output from a panel interface circuit is connected to a selection terminal of the switch element, and a signal line for receiving a gradation signal output from a signal line driving circuit of the display driver is connected to a signal terminal of the switch element; and a microcomputer (3B) that outputs a synchronization signal and display data to the input interface circuit and outputs a control command (CMDb). When displaying still image data on the display panel, the microcomputer stops a supply of the still image data to the display driver by changing the control command to a first state and then resumes a supply of the still image data at a timing after the second circuit becomes operable from a transition of the control command to a second state at intervals between which a gradation signal held in a liquid crystal element of the display panel is to be refreshed.

In this case, when displaying a still image on the low leakage display panel, low power consumption can be realized not only for the display driver, but also for the microcomputer. As a result, it is possible to reduce the power consumption of the entire display system using a low leakage display panel.

[15] Microcomputer

A microcomputer includes: an output interface circuit (30B) that outputs a synchronization signal and display data and outputs a control command (CMDb); and a control circuit (31B) that controls an output operation of the output interface circuit. The control circuit refreshes a gradation signal held in a liquid crystal element of a display panel at predetermined intervals by repeating an operation of stopping an output of still image data from the output interface circuit by changing the control command to a first state and then resuming a supply of the still image data by changing the control command to a second state at the predetermined intervals.

In this case, when displaying a still image on the low leakage display panel through the display driver, it is possible to reduce the power consumption required when the microcomputer transmits the display data.

3. Further Detailed Description of the Embodiments

Embodiments will be described in more detail as follows.

Display Driver of a First Embodiment Corresponding to an Enable Signal

FIG. 1 illustrates a display system using a display driver of a first embodiment corresponding to an enable signal.

A display system includes a liquid crystal display driver (LCDDRV) 1 that is an example of a display driver, a low leakage liquid crystal display panel (PNL) 2 that is an example of a display panel, and a microcomputer (MCU) 3 that is an example of a host processor.

Figure 3:
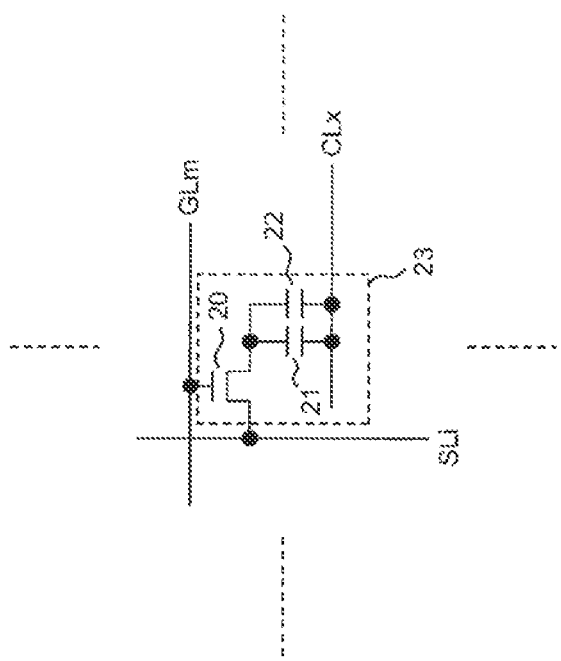
FIG. 3 is a circuit diagram illustrating the circuit configuration of a pixel of the low leakage liquid crystal display panel.

As shown in FIG. 3, in the low leakage liquid crystal display panel 2, one electrode of a liquid crystal display element 21 and one electrode of a capacitive element 22 are connected to a switch element 20 using an oxide semiconductor, and the other electrode of the liquid crystal display element 21 and the other electrode of the capacitive element 22 are connected to a common electrode CLx. Thus, one pixel (subpixel) 23 is formed, and a number of pixels corresponding to the display screen size are arranged in a matrix. A scan line GLm to receive a scan driving signal in units of a row is connected to a selection terminal of the switch element 20, and a signal line SLi to receive a gradation signal in units of a column is connected to a signal terminal of the switch element 20. The capacitive element 22 stores electric charges given by the gradation signal to apply a voltage between both the ends to the liquid crystal display element 21, and the liquid crystal display element 21 maintains the transmittance of a backlight according to the applied voltage. The electric charges stored in the capacitive element 22 are held by the OFF state of the switch element 20 that uses an oxide semiconductor, and the holding time is much longer than that in the case of using a TFT transistor. Accordingly, when displaying a still image, it is not necessary to refresh the pixel 23 in each frame using a gradation signal.

The liquid crystal display driver 1 includes a serial input interface circuit (MIPI-DSI•RX) 10 as an input interface circuit, a timing generating circuit 11, a data calculation circuit (DTCL) 12, an image processing circuit (CABC/SRE/CE) 13, a data latch circuit (DL) 14, a signal line driving circuit (SRCDRV) 15, a panel interface circuit (PNLIF) 16, a gradation voltage generating circuit (VLTGG) 17, and a scan driving voltage generating circuit (DCDC) 18.

Although the serial input interface circuit 10 is not particularly limited, the serial input interface circuit 10 herein is a receiving circuit conforming to the Display Serial Interface (DSI) standard that defines the interface with the display of the Mobile Industry Processor Interface (MIPI) standard. The serial input interface circuit 10 that complies with this standard has two types of transmission modes, for example, a low power (LP) mode and a high speed (HS) mode. The HS mode is mainly used for the transmission of stream data, such as display data, and the LP mode is mainly used for the transmission of a command or the like that does not require high transmission speed. For example in the HS mode, the transmission speed is 80 Mbps to 1.5 Gbps. For example in the LP mode, the transmission speed is 10 Mbps or less. Display data is supplied to the serial input interface circuit 10 in units of a display frame together with frame synchronization data as a synchronization signal. In one example, the synchronization signal is a vertical synchronization (VSYNC) signal. In a retrace period for which the frame synchronization data is supplied, the supply of a command is also possible.

The data calculation circuit (DTCL) 12 performs arithmetic processing on the display data input from the serial input interface circuit 10 according to the register setting. For example, display data supplied in units of a byte from the serial input interface circuit 10 is format-converted to data of a 24-bit unit.

The image processing circuit (CABC/SRE/CE) 13 performs backlight control (CABC), control to increase the visibilitybased on the sense information of an external light sensor (SRE), and calculation of color tone adjustment (CE) for the display data supplied from the data calculation circuit 12.

The data latch circuit (DL) 14 is a data buffer that sequentially switches and holds display data of one scan line in synchronization with the scan line driving timing.

For example, in the case of 256 gradations, the gradation voltage generating circuit (VLTGG) 17 generates gradation voltages of V0 to V255 using a power supply voltage, such as 5 V, and using a resistor divider or the like. The power supply voltage, such as 5 V, may be power supplied directly from the outside, or may be a voltage generated by boosting external power, such as 3.3 V, with an internal booster circuit, such as a switching regulator.

The signal line driving circuit (SRCDRV) 15 selects the above-described gradation voltage for each signal line based on the display data latched by the data latch circuit 14, and outputs a gradation signal.

The scan driving voltage generating circuit (DCDC) 18 generates a scan driving voltage by a charge pump operation. For example, the scan driving voltage generating circuit (DCDC) 18 generates a high scan driving voltage, such as VGH=20 V/VGL=−20 V by performing a charge pump operation on the external power, such as 3.3 V. The scan driving voltage is used as power of a circuit for driving the scan line in the low leakage liquid crystal display panel.

The panel interface circuit (PNLIF) 16 outputs a panel control signal, which is a timing signal for driving the scan line, and a scan driving voltage. The panel control signal is a timing signal for selecting the gate line of the low leakage liquid crystal display panel to which the scan driving voltage is sequentially applied.

The timing generating circuit 11 generates various timing signals 40 used in the liquid crystal display driver 1. The timing signal is generated in response to a command supplied from the microcomputer 3 through the serial input interface circuit 10, frame synchronization data input to the serial input interface circuit 10 together with display data, and an idle driving enable signal 50 supplied by the microcomputer 3. The idle driving enable signal 50 is a level signal. For example, a display operation is instructed at a high level, and the stop of the display operation is instructed at a low level. The details of the stop of the display operation differ depending on the internal circuit.

The stop of the display operation in the serial input interface circuit 10 is an LP mode as a low power consumption mode in which the transmission speed is low.

The stop of the display operation in the data calculation circuit 12 and the image processing circuit 13 is a stop of required data processing on the display data.

The stop of the display operation in the data latch circuit 14 is a latch of a full-bit fixed value (for example, the data value of V0 or the data value of V255) or a stop of the latch operation according to the setting of the first control register.

The stop of the display operation in the signal line driving circuit 15 is an output operation of a full-bit fixed value (for example, V0 or V255) or an output operation stop (output of a ground level) of a gradation signal according to the setting of the first control register. If the data latch circuit 14 is a full-bit fixed value output, the fixed value is similarly output. If the data latch circuit 14 is a latch operation stop, the output operation is stopped.

The stop of the display operation in the gradation voltage generating circuit is a stop of the gradation voltage generating operation or a continuation of the gradation voltage generating operation according to the setting of the first control register. The generation of the gradation voltage is continued if the data latch circuit 14 is in the full-bit fixed value output, and the gradation voltage generation operation is stopped if the data latch circuit 14 is in the latch operation stop.

The stop of the display operation in the panel interface circuit is an output operation stop of the panel control signal or an output operation stop of the scan driving voltage and the panel control signal according to the setting of the second control register.

The stop of the display operation in the scan driving voltage generating circuit is a boosting operation stop (or a reduction in the boost clock frequency) or a continuation of the boosting operation according to the setting of the second control register. According to the output stop of the scan driving voltage in accordance with the setting of the second control register, the boosting operation is stopped (or the boosting clock frequency is reduced).

Although the first and second control registers are not particularly limited, the timing generating circuit 11 or the serial input interface circuit 10 includes the first and second control registers, and can be set so as to be programmable by the microcomputer 3. The setting data is supplied to each corresponding internal circuit.

The timing generating circuit 11 generates a first timing signal 41 and a second timing signal 42 as internal timing signals for controlling the stop of the display operation described above. The first timing signal 41 is supplied to the serial input interface circuit 10, the data calculation circuit 12, the image processing circuit 13, the data latch circuit 14, the signal line driving circuit 15, the panel interface circuit 16, and the gradation voltage generating circuit 17. The second timing signal 42 is supplied to the scan driving voltage generating circuit 18. Here, the serial input interface circuit 10, the data calculation circuit 12, the image processing circuit 13, the data latch circuit 14, the signal line driving circuit 15, the panel interface circuit 16, and the gradation voltage generating circuit 17, to which the first timing signal 41 is supplied, are assumed to be examples of a first circuit. The scan driving voltage generating circuit 18 to which the second timing signal 42 is supplied is assumed to be an example of a second circuit. The second circuit is a circuit block including a circuit having a long activation time until the circuit operation becomes possible from the stop of the circuit operation compared with the first circuit, and the scan driving voltage generating circuit 18 that generates a scan driving voltage by a charge pump operation is a circuit having a relatively long activation time.

The timing generating circuit 11 receives an enable signal 50 from the external microcomputer 3. Then, in response to the inactive state (for example, a low level) of the enable signal 50, the timing generating circuit 11 stops the display operation of the serial input interface circuit 10, the data calculation circuit 12, the image processing circuit 13, the data latch circuit 14, the signal line driving circuit 15, the panel interface circuit 16, and the gradation voltage generating circuit 17 according to the first timing signal 41, and stops the display operation of the scan driving voltage generating circuit 18 according to the second timing signal 42. When the enable signal 50 changes to an active state (for example, a high level), the timing generating circuit 11 resumes the display operation of the scan driving voltage generating circuit 18 according to the second timing signal 42 first, and resumes the display operation of the serial input interface circuit 10, the data calculation circuit 12, the image processing circuit 13, the data latch circuit 14, the signal line driving circuit 15, the panel interface circuit 16, and the gradation voltage generating circuit 17 according to the first timing signal 41 after a predetermined time (Td). The predetermined time Td is a time equal to or greater than a difference in activation time until the circuit operation becomes possible from the stop of the circuit operation between the first and second circuits. The operation of the timing generating circuit 11 using the timing signals 41 and 42 is also referred to as idle driving.

The microcomputer 3 includes a CPU 31, and also includes a serial output interface circuit (MIPI-DSI•TX) 30 as an output interface circuit, a random access memory (RAM) 32, a read only memory (ROM) 34, and an input/output port (I/O) 33 that the CPU 31 can access through an internal bus 35. The CPU 31 controls the operation of the serial output interface circuit 30, the RAM 32, the ROM 34, the input/output port 33, and the like by fetching and executing a command from the ROM 34 that holds a program. The serial output interface circuit 30 is a transmission circuit that complies with the DSI standard of the MIPI described above, and serially outputs the display data and the frame synchronization data to the serial input interface circuit 10 under the control of the CPU 31. Command transmission is also possible during the retrace period. The input/output port 33 performs an external input/output interface operation according to the setting of the CPU 31. The output of the enable signal 50 is performed through the input/output port 33. The RAM 32 is used as a work area of the CPU 31, for example. A program of the CPU or the like is stored in the ROM 34.

When displaying still image data on the low leakage liquid crystal display panel 2, the CPU 31 repeats an operation of stopping the output of the still image data from the serial output interface circuit 30 by changing the enable signal 50 to an inactive state and then resuming the output of the still image data by changing the enable signal 50 to an active state at intervals (refresh intervals) between which a gradation signal held in a liquid crystal element of the display panel 2 is to be refreshed. Accordingly, the gradation signal held in the liquid crystal element of the display panel can be refreshed at the predetermined intervals. Time until the output of the still image data resumes after changing the enable signal 50 to an active state is the above-described predetermined time that is a timing after the second circuit can operate from the change of the enable signal 50 to the active state.

Figure 2:
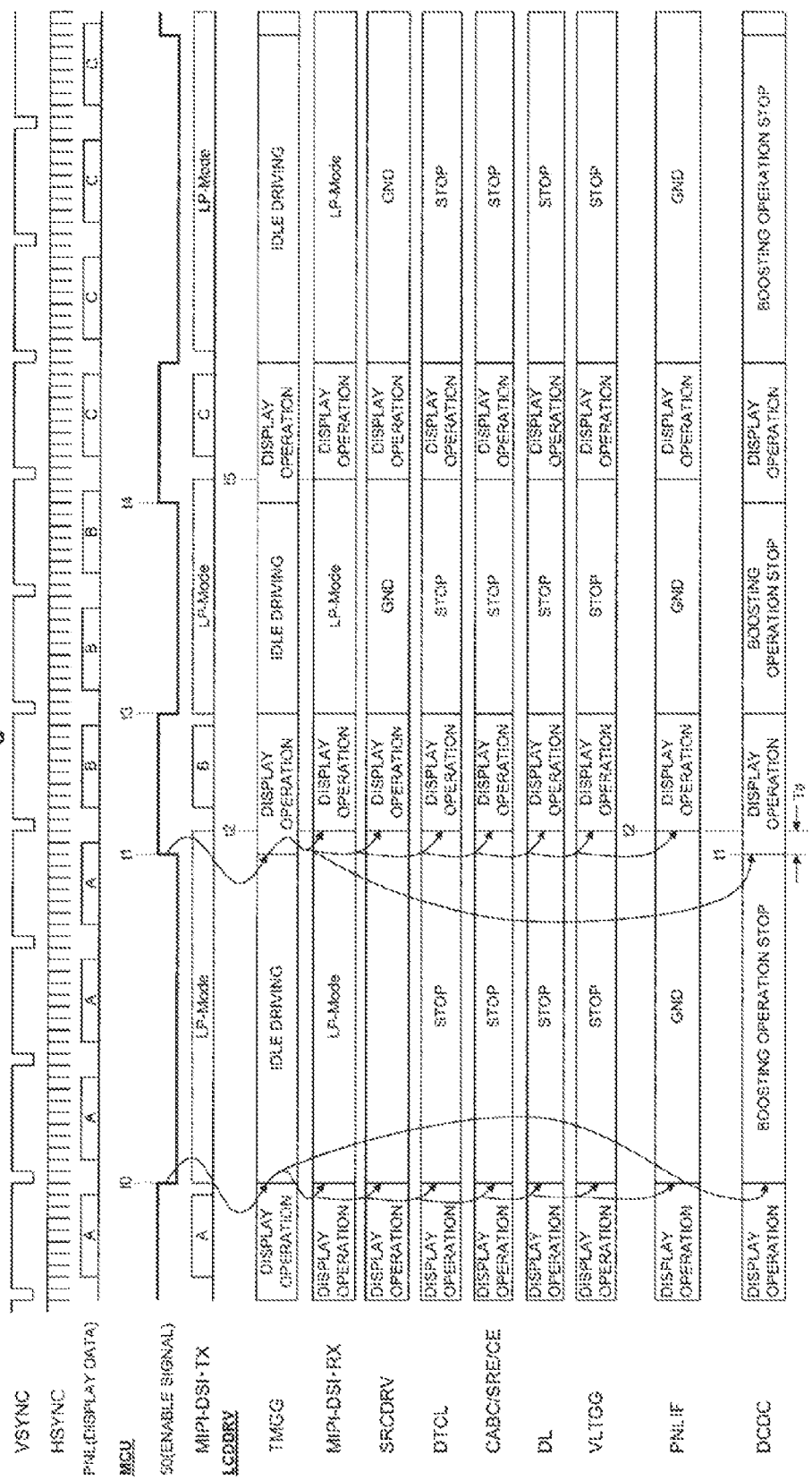
FIG. 2 is a timing chart illustrating the operation timing of still image display driving for a low leakage liquid crystal display panel by the display driver of the first embodiment.

Display operation timing by the liquid crystal display driver 1 for the low leakage liquid crystal display panel 2 is illustrated in FIG. 2. VSYNC indicates a vertical synchronization signal based on frame synchronization data, and HSYNC indicates a horizontal synchronization signal.

When displaying the still image data on the low leakage liquid crystal display panel 2, the CPU 31 stops the output of the still image data from the serial output interface circuit 30 by changing the enable signal 50 to a low-level inactive state at refresh intervals of the low leakage liquid crystal display panel 2 (t0). The serial output interface circuit 30 is set to the LP mode at time t0.

In response to the inactive state (t0) to the low level, the timing generating circuit 11 that receives the enable signal 50 shifts the control mode from the display operation to idle driving, sets the serial input interface circuit 10 to the LP mode, and shifts the data calculation circuit 12, the image processing circuit 13, the data latch circuit 14, the signal line driving circuit 15, the panel interface circuit 16, the gradation voltage generating circuit 17, and the scan driving voltage generating circuit 18 to the display operation stop state. FIG. 2 shows an example where the outputs of the signal line driving circuit 15 and the panel interface circuit 16 transition to a ground level (GND) and the scan driving voltage generating circuit 18 is in a boosting operation stop state.

The CPU 31 changes the enable signal 50 to an active state (t1) when the end of the refresh interval is recognized by timer control or the like. In response to the active state (t1) for the high level, the timing generating circuit 11 shifts the control mode from the idle driving to the display operation, and resumes the boosting operation of the scan driving voltage generating circuit 18 first. At a timing (t2) after the predetermined time Td described above has passed from the time t1, the timing generating circuit 11 sets the serial input interface circuit 10 to the HS mode, and shifts the data calculation circuit 12, the image processing circuit 13, the data latch circuit 14, the signal line driving circuit 15, the panel interface circuit 16, and the gradation voltage generating circuit 17 to the display operation state.

Accordingly, during the 3-display-frame period from time t0 to t2 for display data A, the microcomputer 3 realizes low power consumption by stopping the output of the display data, and the liquid crystal display driver 1 realizes low power consumption by stopping the display operation of the first and second circuits. Also for the next still image data B, a display operation from time t3 to t5 is stopped after a display operation from time t2 to t3 is performed. Thus, low power consumption is realized. Accordingly, it is possible to promote the low power consumption of the entire display system, which includes the microcomputer 3 and the liquid crystal display driver 1, by taking advantage of the low power consumption characteristics of the low leakage liquid crystal display panel 2.

In particular, since the microcomputer 3 gives an instruction of the display operation and the stop of the display operation using the enable signal 50 instead of a command using a retrace period, the timing that can be designated is not limited to the retrace period. Therefore, it is possible to increase the flexibility with respect to the timing of the stop control of the display operation in relation to the display state or the display mode.

The operation restart timing of the circuit 18 that performs a charge pump operation, which requires a long time delay until the operation resumes from the stop of the display operation, is earlier than the operation restart timing of other circuits. Therefore, a waiting time that is wasted before the operation resumes does not occur.

In addition, circuit operation restart to resume the operation first as the scan driving voltage generating circuit 18 is made to respond to the activation of the enable signal 50, and the operation restart timing of other circuits is determined according to the specifications of the liquid crystal display driver 1. Therefore, the microcomputer 3 may use a predetermined time as a control parameter for defining the output restart timing of the display data. When trying to control the timing of t1, t2, and t3 using the microcomputer 3, the change of the enable signal 50 should be controlled in a complicated manner, or the number of signal bits should be increased to 2 bits. That is, the burden of control is increased.

Display Driver of a Second Embodiment Corresponding to an Enable Signal

Figure 4:
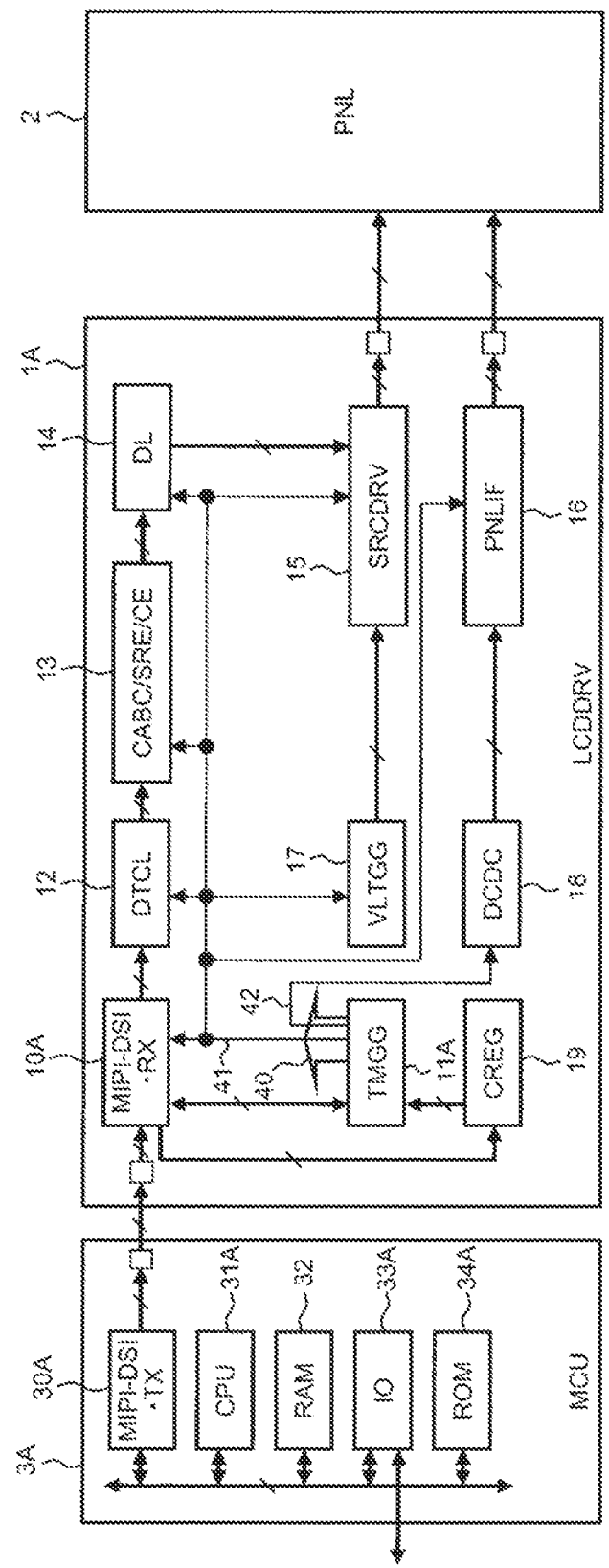
FIG. 4 is a block diagram illustrating a display system using a display driver of a second embodiment corresponding to a display enable command.

FIG. 4 illustrates a display system using a display driver of a second embodiment corresponding to an enable signal. The display system shown in FIG. 4 includes a liquid crystal display driver (LCDDRV) 1A as a display driver, a low leakage liquid crystal display panel (PNL) 2 as a display panel, and a microcomputer (MCU) 3A as a host processor.

The liquid crystal display driver 1A includes a serial input interface circuit (MIPI-DSI•RX) 10A, a timing generating circuit 11A, a data calculation circuit (DTCL) 12, an image processing circuit (CABC/SRE/CE) 13, a data latch circuit (DL) 14, a signal line driving circuit (SRCDRV) 15, a panel interface circuit (PNLIF) 16, a gradation voltage generating circuit (VLTGG) 17, a scan driving voltage generating circuit (DCDC) 18, and a command register (CREG) 19.

The following points are different from the liquid crystal display driver 1 shown in FIG. 1. That is, the timing generating circuit 11A does not receive the enable signal 50 from the microcomputer 3A, but the command register 19 receives a control command CMDa issued to the serial input interface circuit 10A by the microcomputer 3A in a retrace period or the like. Based on the control command CMDa set in the command register 19, the timing generating circuit 11A generates the first timing signal 41 and the second timing signal 42. When the received control command CMDa is a first state (for example, when the received control command CMDa has a first value), the timing generating circuit 11A stops the display operation of the serial input interface circuit 10A, the data calculation circuit 12, the image processing circuit 13, the data latch circuit 14, the signal line driving circuit 15, the panel interface circuit 16, the gradation voltage generating circuit 17, and the scan driving voltage generating circuit 18. Then, when the received control command CMDa is a second state (for example, when the received control command CMDa has a second value), the timing generating circuit 11A resumes the display operation of the scan driving voltage generating circuit 18 as a second circuit. Then, when the received control command CMDa is a third state (for example, when the received control command CMDa has a third value), the timing generating circuit 11A resumes the display operation of the serial input interface circuit 10A, the data calculation circuit 12, the image processing circuit 13, the data latch circuit 14, the signal line driving circuit 15, the panel interface circuit 16, and the gradation voltage generating circuit 17. The meaning of the stop and restart of the display operation is the same as that described based on FIG. 1. Since the other configuration of the liquid crystal display driver 1A is the same as that shown in FIG. 1, the same reference numerals are given to circuits having the same functions, and explanation thereof will be omitted.

The microcomputer 3A includes a CPU 31A, and also includes a serial output interface circuit (MIPI-DSI•TX) 30A, a RAM 32, a ROM 34A, and an input/output port (I/O) 33A that the CPU 31A can access through an internal bus 35. The CPU 31A controls the operation of the serial output interface circuit 30A, the RAM 32, the ROM 34A, the input/output port 33A, and the like by fetching and executing a command from the ROM 34A that holds a program. The serial output interface circuit 30A is a transmission circuit that complies with the DSI standard of the MIPI described above, and serially outputs display data and frame synchronization data to the serial interface 10A under the control of the CPU 31A. The transmission of the control command described above is also possible during the retrace period. The input/output port 33A performs an external input/output interface operation according to the setting of the CPU 31A, but does not have an output function of the enable signal 50.

In the microcomputer 3A, when displaying a still image on the low leakage liquid crystal display panel 2, the CPU 31A that executes a program of the ROM 34A stops the output of the still image data from the serial output interface circuit 30A by shifting the control command CMDa to the first state, shifts the control command CMDa to the second state after the output stop, shifts the control command CMDa to the third state after the predetermined time Td has passed, and then resumes the supply of the still image data, at refresh intervals of the low leakage liquid crystal display panel 2. By repeating this operation, the gradation signal held in the liquid crystal element of the low leakage liquid crystal display panel 2 can be refreshed at the refresh intervals. Since the other configuration of the microcomputer 3A is the same as that shown in FIG. 1, the same reference numerals are given to circuits having the same functions, and explanation thereof will be omitted.

Figure 5:
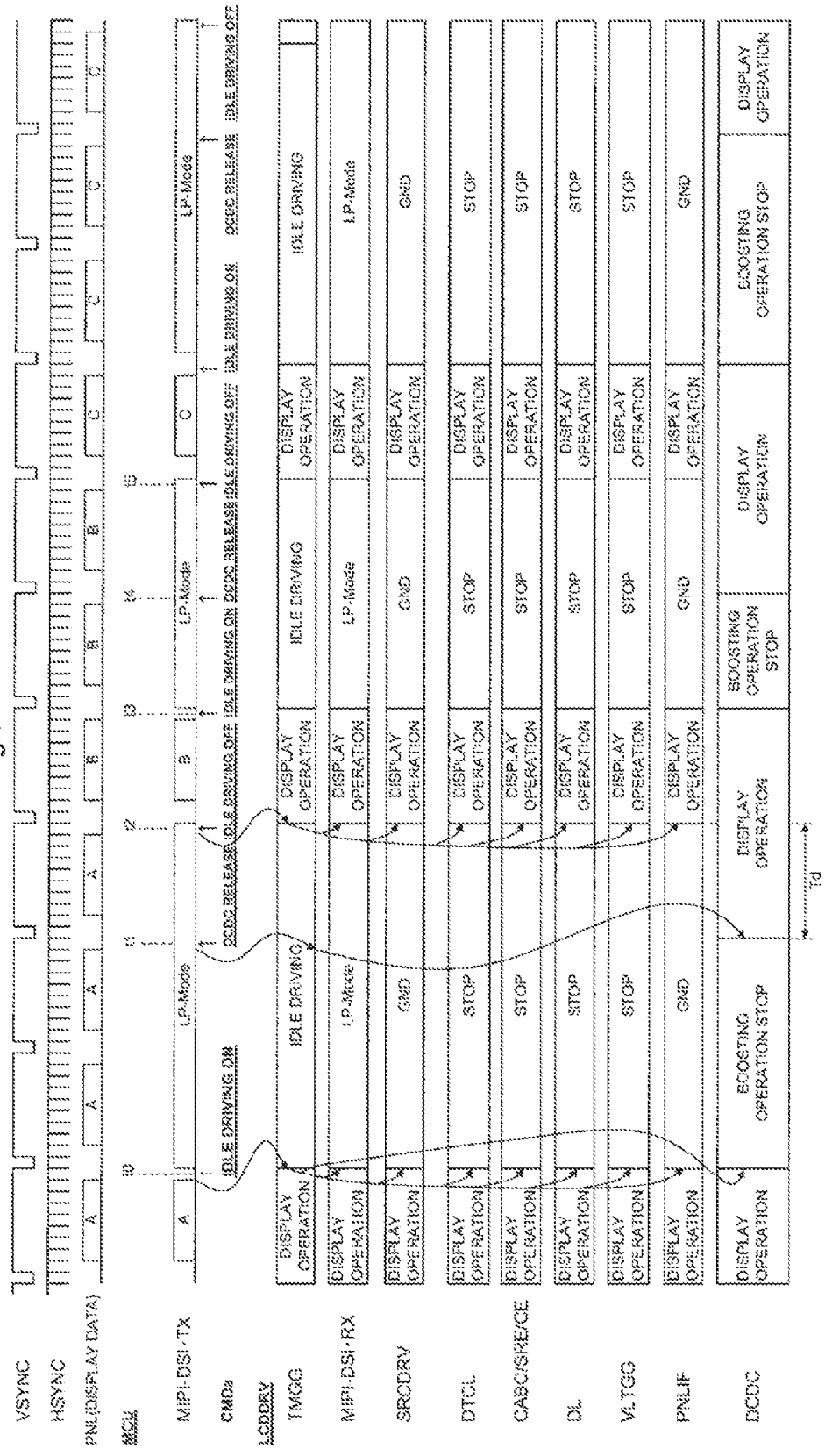
FIG. 5 is a timing chart illustrating the operation timing of still image display driving for a low leakage liquid crystal display panel by the display driver of the second embodiment.

Display operation timing by the liquid crystal display driver 1A for the low leakage liquid crystal display panel 2 is illustrated in FIG. 5. VSYNC indicates a vertical synchronization signal based on frame synchronization data, and HSYNC indicates a horizontal synchronization signal.

When displaying the still image data on the low leakage liquid crystal display panel 2, the CPU 31A stops the output of the still image data from the serial output interface circuit 30A by making the serial output interface circuit 30A issue the control command CMDa (control command of idle driving On) of the first value at refresh intervals of the low leakage liquid crystal display panel 2 (t0). Issuing the control command CMDa of the first value is performed in a retrace period, and the serial output interface circuit 30A is set to the LP mode at time t0.

In response to the command, the timing generating circuit 11A that receives the control command CMDa (control command of idle driving On) of the first value shifts the control mode from the display operation to idle driving (t0), sets the serial input interface circuit 10A to the LP mode, and shifts the data calculation circuit 12, the image processing circuit 13, the data latch circuit 14, the signal line driving circuit 15, the panel interface circuit 16, the gradation voltage generating circuit 17, and the scan driving voltage generating circuit 18 to the display operation stop state. Similar to FIG. 2, FIG. 5 shows an example where the outputs of the signal line driving circuit 15 and the panel interface circuit 16 transition to a ground level (GND) and the scan driving voltage generating circuit 18 is in a boosting operation stop state.

When reaching the predetermined time (Td) at which the refresh interval ends is recognized by timer control or the like, the CPU 31A causes the serial output circuit 30A in the LP mode to issue the control command CMDa (control command of DCDC release) of the second value (t1). In response to the control command CMDa of the second value, the timing generating circuit 11A shifts the control mode from the idle driving to the display operation (t1), and resumes the boosting operation of the scan driving voltage generating circuit 18 first. In addition, when the passage of the predetermined time (Td) from the time t1 is recognized by timer control or the like, the CPU 31A causes the serial output circuit 30A to issue the control command CMDa (idle driving Off command) of the third value (t2). The timing generating circuit 11A that receives the control command CMDa of the third value sets the serial input interface circuit 10A to the HS mode, and shifts the data calculation circuit 12, the image processing circuit 13, the data latch circuit 14, the signal line driving circuit 15, the panel interface circuit 16, and the gradation voltage generating circuit 17 to the display operation state.

Accordingly, during the 3-display-frame period from time t0 to t2 for the display data A, the microcomputer 3A realizes low power consumption by stopping the output of the display data, and the liquid crystal display driver 1A realizes low power consumption by stopping the display operation of the first and second circuits. Also for the next still image data B, a display operation from time t3 to t5 is stopped after a display operation from time t2 to t3 is performed. Thus, low power consumption is realized. Accordingly, it is possible to promote the low power consumption of the entire display system, which includes the microcomputer 3A and the liquid crystal display driver 1A, by taking advantage of the low power consumption characteristics of the low leakage liquid crystal display panel 2.

In particular, the microcomputer 3A can transmit the issuance of the control command of the second value and the control command of the third value using the serial output interface circuit 30A and the serial input interface circuit 10A in the LP mode. Therefore, since the issuance timing of all control commands is not limited to the retrace period, it is possible to obtain a certain degree of flexibility with respect to the timing of the stop control of the display operation in relation to the display state or the display mode.

The operation restart timing of the scan driving voltage generating circuit 18 that performs a charge pump operation, which requires a long time until the operation resumes from the stop of the display operation, is earlier than the operation restart timing of other circuits. Therefore, a waiting time that is wasted before the operation resumes does not occur.

In addition, the timing of three places of t1, t2, and t3 can be freely controlled by the software of the microcomputer 4. Therefore, the burden of software control is increased compared with FIG. 1, but the degree of freedom of control can be increased.

Display Driver of a Third Embodiment Corresponding to an Enable Signal

Figure 6:
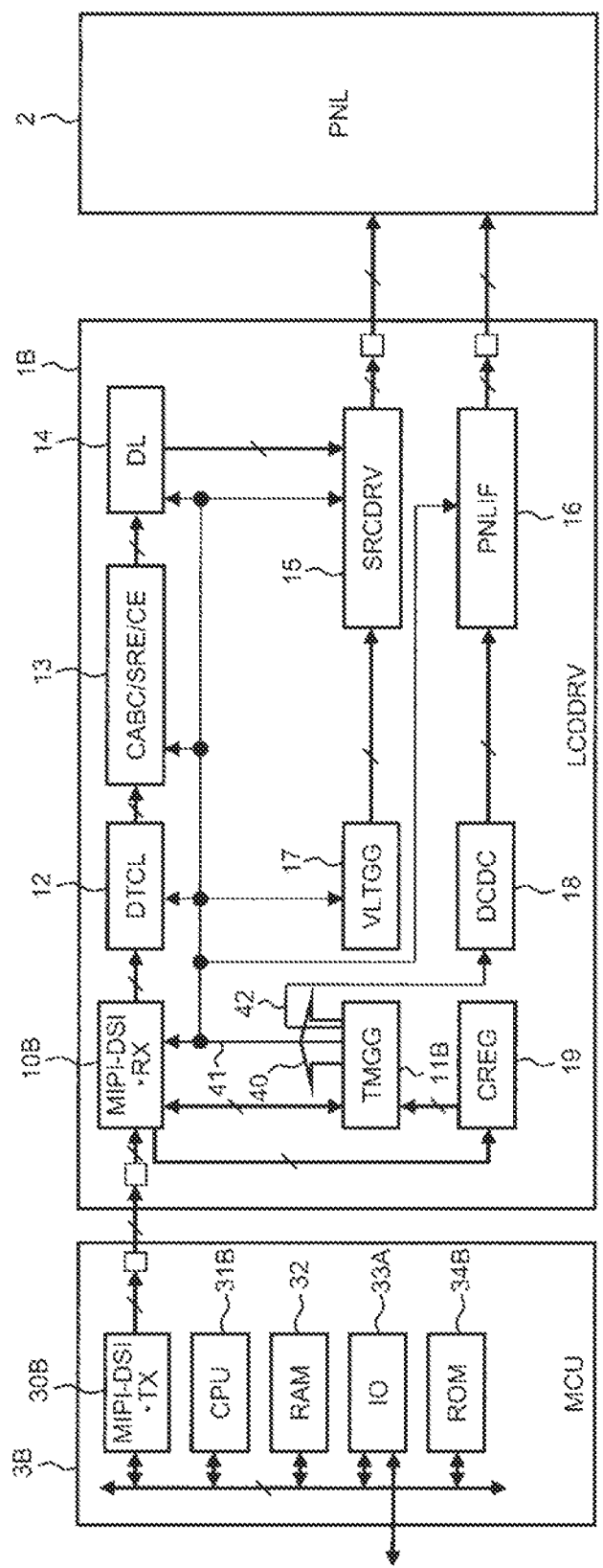
FIG. 6 is a block diagram illustrating a display system using a display driver of a third embodiment corresponding to a display enable command.

FIG. 6 illustrates a display system using a display driver of a third embodiment corresponding to an enable signal. The display system shown in FIG. 6 includes a liquid crystal display driver (LCDDRV) 1B as a display driver, a low leakage liquid crystal display panel (PNL) 2 as a display panel, and a microcomputer (MCU) 3B as a host processor.

The liquid crystal display driver 1B includes a serial input interface circuit (MIPI-DSI•RX) 10B, a timing generating circuit 11B, a data calculation circuit (DTCL) 12, an image processing circuit (CABC/SRE/CE) 13, a data latch circuit (DL) 14, a signal line driving circuit (SRCDRV) 15, a panel interface circuit (PNLIF) 16, a gradation voltage generating circuit (VLTGG) 17, a scan driving voltage generating circuit (DCDC) 18, and a command register (CREG) 19.

The following points are different from the liquid crystal display driver 1 shown in FIG. 4. That is, the command register 19 receives a control command CMDb issued to the serial input interface circuit 10B by the microcomputer 3B in a retrace period or the like. Based on the control command CMDb set in the command register 19, the timing generating circuit 11B generates the first timing signal 41 and the second timing signal 42. When the received control command CMDb is a first state (for example, when the received control command CMDb has a first value), the timing generating circuit 11B stops the display operation of the serial input interface circuit 10B, the data calculation circuit 12, the image processing circuit 13, the data latch circuit 14, the signal line driving circuit 15, the panel interface circuit 16, the gradation voltage generating circuit 17, and the scan driving voltage generating circuit 18. Then, when the received control command CMDb is a second state (for example, when the received control command CMDb has a second value), the timing generating circuit 11B resumes the display operation of the scan driving voltage generating circuit 18 as a second circuit. Then, the timing generating circuit 11B resumes the display operation of the serial input interface circuit 10B, the data calculation circuit 12, the image processing circuit 13, the data latch circuit 14, the signal line driving circuit 15, the panel interface circuit 16, and the gradation voltage generating circuit 17 after the predetermined time Td has passed. The meaning of the stop and restart of the display operation is the same as that described based on FIG. 1. Since the other configuration of the liquid crystal display driver 1B is the same as that shown in FIG. 1, the same reference numerals are given to circuits having the same functions, and explanation thereof will be omitted.

The microcomputer 3B includes a CPU 31B, and also includes a serial output interface circuit (MIPI-DSI•TX) 30B, a RAM 32, a ROM 34B, and an input/output port (I/O) 33A that the CPU 31B can access through an internal bus 35. The CPU 31B controls the operation of the serial output interface circuit 30B, the RAM 32, the ROM 34B, the input/output port 33A, and the like by fetching and executing a command from the ROM 34B that holds a program. The serial output interface circuit 30B is a transmission circuit that complies with the DSI standard of the MIPI described above, and serially outputs display data and frame synchronization data to the serial interface 10B under the control of the CPU 31B. The transmission of the control command CMDb described above is also possible during the retrace period. The input/output port 33A performs an external input/output interface operation according to the setting of the CPU 31B, but does not have an output function of the enable signal 50.

In the microcomputer 3B, when displaying a still image on the low leakage liquid crystal display panel 2, the CPU 31B that executes a program of the ROM 34B stops the output of the still image data from the serial output interface circuit 30B by shifting the control command CMDb to the first state, shifts the control command CMDb to the second state after the output stop, and then resumes the supply of the still image data after the predetermined time Td has passed, at refresh intervals of the low leakage liquid crystal display panel 2. By repeating this operation, the gradation signal held in the liquid crystal element of the low leakage liquid crystal display panel 2 can be refreshed at the refresh intervals. Since the other configuration of the microcomputer 3B is the same as that shown in FIG. 1, the same reference numerals are given to circuits having the same functions, and explanation thereof will be omitted.

Display operation timing by the liquid crystal display driver 1B for the low leakage liquid crystal display panel 2 is illustrated in FIG. 7. VSYNC indicates a vertical synchronization signal based on frame synchronization data, and HSYNC indicates a horizontal synchronization signal.

When displaying the still image data on the low leakage liquid crystal display panel 2, the CPU 31B stops the output of the still image data from the serial output interface circuit 30B by making the serial output interface circuit 30B issue the control command CMDb (control command of idle driving On) of the first value at refresh intervals of the low leakage liquid crystal display panel 2 (t0). Issuing the control command CMDb of the first value is performed in a retrace period, and the serial output interface circuit 30B is set to the LP mode at time t0.

In response to the command, the timing generating circuit 11B that receives the control command CMDb (control command of idle driving On) of the first value shifts the control mode from the display operation to idle driving (t0), sets the serial input interface circuit 10B to the LP mode, and shifts the data calculation circuit 12, the image processing circuit 13, the data latch circuit 14, the signal line driving circuit 15, the panel interface circuit 16, the gradation voltage generating circuit 17, and the scan driving voltage generating circuit 18 to the display operation stop state. Similar to FIG. 2, FIG. 7 shows an example where the outputs of the signal line driving circuit 15 and the panel interface circuit 16 transition to a ground level (GND) and the scan driving voltage generating circuit 18 is in a boosting operation stop state.

When reaching the predetermined time (Td) at which the refresh interval ends is recognized by timer control or the like, the CPU 31B causes the serial output circuit 30B in the LP mode to issue the control command CMDb (control command of DCDC release) of the second value (t1). In response to the control command CMDb of the second value, the timing generating circuit 11B shifts the control mode from the idle driving to the display operation (t1), and resumes the boosting operation of the scan driving voltage generating circuit 18 first. Then, after the predetermined time Td has passed from the time t1, the timing generating circuit 11B sets the serial input interface circuit 10B to the HS mode, and shifts the data calculation circuit 12, the image processing circuit 13, the data latch circuit 14, the signal line driving circuit 15, the panel interface circuit 16, and the gradation voltage generating circuit 17 to the display operation state.

Accordingly, during the 3-display-frame period from time t0 to t2 for the display data A, the microcomputer 3B realizes low power consumption by stopping the output of the display data, and the liquid crystal display driver 1B realizes low power consumption by stopping the display operation of the first and second circuits. Also for the next still image data B, a display operation from time t3 to t5 is stopped after a display operation from time t2 to t3 is performed. Thus, low power consumption is realized. Accordingly, it is possible to promote the low power consumption of the entire display system, which includes the microcomputer 3B and the liquid crystal display driver 1B, by taking advantage of the low power consumption characteristics of the low leakage liquid crystal display panel 2.

In particular, the microcomputer 3B can transmit the issuance of the control command of the second value using the serial output circuit 30B and the serial input interface circuit 10B in the LP mode. Therefore, since the issuance timing of all control commands is not limited to the retrace period, it is possible to obtain a certain degree of flexibility with respect to the timing of the stop control of the display operation in relation to the display state or the display mode.

The operation restart timing of the scan driving voltage generating circuit 18 that performs a charge pump operation, which requires a long time until the operation resumes from the stop of the display operation, is earlier than the operation restart timing of other circuits. Therefore, a waiting time that is wasted before the operation resumes does not occur.

In addition, the timing of three places of t1, t2, and t3 can be freely controlled by the software of the microcomputer 3, and the burden of software control on the CPU can be reduced compared with FIG. 2 since the timing of time t3 is determined by the specification of the liquid crystal display driver 1B. Accordingly, it is possible to increase the degree of freedom of control compared with FIG. 1.

The invention is not limited to the embodiments described above, and various modifications can be made within the range not departing from the subject matter.

For example, specific circuits that form the first and second circuits are not limited to the above embodiments described in FIG. 1 and the like. The display driver may include circuits other than the serial input interface circuit, the timing generating circuit, and the first and second circuits. In this case, the circuit that is enable-controlled may further include a third circuit.

The power of the gradation voltage generating circuit (VLTGG) or the operating power of the scan driving voltage generating circuit (DCDC) may be directly supplied from an external power supply, or a power supply circuit that receives system power, such as 3.3 V, from the outside and generates the power of the gradation voltage generating circuit or the operating power of the scan driving voltage generating circuit may be separately provided.

The meaning of the stop and restart of the display operation is not limited to that described based on FIG. 1. The selection mode by the first and second control registers in this case is only an example, and can be appropriately changed.

The generation of the scan driving voltage is not limited to the charge pump operation, and other boosting operations may be adopted.

The interface circuit that receives display data and a synchronization signal and the interface circuit that outputs the display data and the synchronization signal are not limited to the serial interface, such as the MIPI-DSI. Other serial interface specifications may be adopted, or a parallel interface may be adopted.

In addition, the control circuit in the microcomputer is not limited to the CPU, and may be other logic circuits.

What is claimed is:

1. A display system, comprising:
an input interface circuit configured to receive display data and a synchronization signal;
a timing generating circuit configured to generate an internal timing signal in synchronization with the synchronization signal; and
first and second circuits configured to generate and output, respectively, a signal supplied to a scan line of a display panel and a signal supplied to a signal line of the display panel, using the display data input from the input interface circuit, the first and second circuits configured to perform a display operation controlled by the internal timing signal,
wherein the second circuit includes a circuit having a longer activation time compared with an activation time of the first circuit,
the timing generating circuit is configured to, upon receipt of an enable signal, stop a display operation of the input interface circuit and the first and second circuits in response to an inactive state of the enable signal, and resume the display operation of the input interface circuit and the first and second circuits in response to an active state of the enable signal, and
the display operation of the second circuit resuming in response to the active state of the enable signal earlier than the display operation of the input interface circuit and the first circuit in response to the active state of the enable signal by a predetermined time.

2. The display system according to claim 1,
wherein the first circuit includes a processing circuit configured to perform data processing on the display data input from the input interface circuit, a latch circuit configured to latch data processed by the processing circuit in units of a scan line, a signal line driving circuit configured to generate and output a gradation signal to the signal line based on the data latched in the latch circuit, a panel interface circuit configured to output a scan driving signal for driving the scan line based on the generated internal timing signal, and a gradation voltage generating circuit configured to generate a gradation voltage of the gradation signal, and
wherein the second circuit includes a scan driving voltage generating circuit configured to generate a scan driving voltage of the scan driving signal, which is a higher voltage than the gradation voltage, by a charge pump operation.

3. The display system according to claim 2, wherein:
a stop of a display operation in the input interface circuit includes a low power consumption mode in which a transmission speed is low;
a stop of a display operation in the processing circuit includes a stop of required data processing on the display data;
a stop of a display operation in the latch circuit includes a full-bit fixed value latch or a stop of a latch operation according to a setting of a control register;
a stop of a display operation in the signal line driving circuit includes a full-bit fixed value output operation or a stop of an output operation of the gradation signal according to a setting of a control register;
a stop of a display operation in the gradation voltage generating circuit includes a stop or a continuation of a gradation voltage generating operation according to a setting of a control register;
a stop of a display operation in the panel interface circuit includes a stop of an output operation of the scan driving signal; and
a stop of a display operation in the scan driving voltage generating circuit includes a boosting operation stop or a reduction in a boosting clock frequency according to a setting of a control register.

4. The display system of claim 1, further comprising:
a display panel including pixels each of which includes:
   a liquid crystal display element connected in series to a switch element using an oxide semiconductor, wherein the pixels being arranged in a matrix;
   a scan line configured to receive a scan driving signal output from a display driver connected to a selection terminal of each switch element; and
   a signal line configured to receive a gradation signal output from the display driver connected to a signal terminal of each switch element; and
a microcomputer configured to: supply display data to the input interface circuit together with the synchronization signal and output an enable signal to the timing generating circuit,
wherein, when displaying still image data on the display panel, the microcomputer is further configured to stop a supply of the still image data to the display driver by changing the enable signal to an inactive state and then resume an output of the still image data at after the second circuit becomes operable from a transition of the enable signal to an active state at intervals between which a gradation signal held in a liquid crystal element of the display panel is to be refreshed.

5. A microcomputer, comprising:
an output interface circuit configured to output display data and a synchronization signal;
an output port configured to output an enable signal; and
a control circuit configured to control an output operation of the output interface circuit and an output operation of the output port,
wherein the control circuit is configured to refresh a gradation signal held in a liquid crystal element of a display panel at predetermined intervals by repeating an operation of stopping an output of still image data from the output interface circuit by changing the enable signal to an inactive state and then resuming the output of the still image data by changing the enable signal to an active state at the predetermined intervals.

6. A display system, comprising:
an input interface circuit configured to receive a synchronization signal, display data, and a command;
first and second circuits configured to generate and output, respectively, a signal supplied to a scan line of a display panel and a signal supplied to a signal line of the display panel, using the display data input from the input interface circuit, the first and second circuits configured to perform a display operation controlled by the internal timing signal,
wherein the second circuit includes a circuit having a longer activation time compared with an activation time of the first circuit; and
a timing generating circuit configured to:
   generate an internal timing signal in synchronization with the synchronization signal;
   receive a control command input from the input interface circuit;
   stop a display operation of the input interface circuit and the first and second circuits in response to a first state of the control command;
   resume the display operation of the second circuit in response to a second state of the control command; and
   resume the display operation of the input interface circuit and the first circuit in response to a third state of the control command.

7. The display system according to claim 6,
wherein the first circuit includes a processing circuit configured to perform data processing on the display data input from the input interface circuit, a latch circuit configured to latch data processed by the processing circuit in units of a scan line, a signal line driving circuit configured to generate and output a gradation signal to the signal line based on the data latched in the latch circuit, a panel interface circuit configured to output a scan driving signal for driving the scan line based on the generated internal timing signal, and a gradation voltage generating circuit configured to generate a gradation voltage of the gradation signal, and
the second circuit includes a scan driving voltage generating circuit configured to generate a scan driving voltage of the scan driving signal, which is a higher voltage than the gradation voltage, by a charge pump operation.

8. The display system according to claim 7, wherein:
a stop of a display operation in the input interface circuit includes a low power consumption mode in which a transmission speed is low;
a stop of a display operation in the processing circuit includes a stop of required data processing on the display data;
a stop of a display operation in the latch circuit includes a full-bit fixed value latch or a stop of a latch operation according to a setting of a control register;
a stop of a display operation in the signal line driving circuit includes a full-bit fixed value output operation or a stop of an output operation of the gradation signal according to a setting of a control register;
a stop of a display operation in the gradation voltage generating circuit includes a stop or a continuation of a gradation voltage generating operation according to a setting of a control register;
a stop of a display operation in the panel interface circuit includes a stop of an output operation of the scan driving signal; and
a stop of a display operation in the scan driving voltage generating circuit includes a boosting operation stop or a reduction in a boosting clock frequency according to a setting of a control register.

9. The display system of claim 6, further comprising:
a display panel including pixels each of which includes a liquid crystal display element connected in series to a switch element using an oxide semiconductor, the pixels arranged in a matrix, the display panel including a scan line configured to receive a scan driving signal output from a panel interface circuit connected to a selection terminal of each switch element, and a signal line configured to receive a gradation signal output from a signal line driving circuit of a display driver connected to a signal terminal of each switch element; and
a microcomputer configured to output a synchronization signal and display data to the input interface circuit and configured to output a control command,
wherein, when displaying still image data on the display panel, the microcomputer is further configured to stop a supply of the still image data to the display driver by changing the control command to a first state and then resume a supply of the still image data after a transition of the control command to a third state from a transition of the control command to a second state at intervals between which a gradation signal held in a liquid crystal element of the display panel is to be refreshed.

10. A microcomputer, comprising:
an output interface circuit configured to output a synchronization signal, display data, and a control command; and
a control circuit configured to control an output operation of the output interface circuit,
wherein the control circuit is configured to refresh a gradation signal held in a liquid crystal element of a display panel at predetermined intervals by repeating an operation of stopping an output of still image data from the output interface circuit by changing the control command to a first state and then resume a supply of the still image data after a transition of the control command to a third state from a transition of the control command to a second state at the predetermined intervals.

11. A display system, comprising:
an input interface circuit configured to receive a synchronization signal, display data, and a command;
a timing generating circuit configured to generate an internal timing signal in synchronization with the synchronization signal; and
first and second circuits configured to generate and output, respectively, a signal supplied to a scan line of a display panel and a signal supplied to a signal line of the display panel, using the display data input from the input interface circuit, the first and second circuits configured to perform a display operation controlled by the internal timing signal,
wherein the second circuit includes a circuit having a longer activation time compared with an activation time of the first circuit,
the timing generating circuit configured to receive a control command input from the input interface circuit, stop a display operation of the input interface circuit and the first and second circuits in response to a first state of the control command, and resume the display operation of the first and second circuits in response to a second state of the control command, and
the display operation of the second circuit resuming in response to the second state of the control command earlier than the display operation of the input interface circuit and the first circuit in response to the second state of the control command by a predetermined time.

12. The display system according to claim 11,
wherein the first circuit includes a processing circuit configured to perform data processing on the display data input from the input interface circuit, a latch circuit configured to latch data processed by the processing circuit in units of a scan line, a signal line driving circuit configured to generate and output a gradation signal to the signal line based on the data latched in the latch circuit, a panel interface circuit configured to output a scan driving signal for driving the scan line based on the generated internal timing signal, and a gradation voltage generating circuit configured to generate a gradation voltage of the gradation signal, and
the second circuit includes a scan driving voltage generating circuit configured to generate a scan driving voltage of the scan driving signal, which is a higher voltage than the gradation voltage, by a charge pump operation.

13. The display system according to claim 12, wherein:
a stop of a display operation in the input interface circuit includes a low power consumption mode in which a transmission speed is low;
a stop of a display operation in the processing circuit includes a stop of required data processing on the display data;
a stop of a display operation in the latch circuit includes a full-bit fixed value latch or a stop of a latch operation according to a setting of a control register;
a stop of a display operation in the signal line driving circuit includes a full-bit fixed value output operation or a stop of an output operation of the gradation signal according to a setting of a control register;
a stop of a display operation in the gradation voltage generating circuit includes a stop or a continuation of a gradation voltage generating operation according to a setting of a control register;
a stop of a display operation in the panel interface circuit includes a stop of an output operation of the scan driving signal; and
a stop of a display operation in the scan driving voltage generating circuit includes a boosting operation stop or a reduction in a boosting clock frequency according to a setting of a control register.

14. The display system of claim 11, further comprising:
a display panel having pixels each of which includes a liquid crystal display element connected in series to a switch element using an oxide semiconductor, the pixels arranged in a matrix, the display panel including a scan line configured to receive a scan driving signal output from a panel interface circuit connected to a selection terminal of each switch element, and a signal line configured to receive a gradation signal output from a signal line driving circuit of a display driver connected to a signal terminal of each switch element; and
a microcomputer configured to serially output a synchronization signal and display data to the input interface circuit, the microcomputer configured to output a control command,
wherein, when displaying still image data on the display panel, the microcomputer is further configured to stop a supply of the still image data to the display driver by changing the control command to a first state and then resume a supply of the still image data after the second circuit becomes operable from a transition of the control command to a second state at intervals between which a gradation signal held in a liquid crystal element of the display panel is to be refreshed.

15. A microcomputer, comprising:
an output interface circuit configured to output a synchronization signal, display data, and a control command; and
a control circuit configured to control an output operation of the output interface circuit,
wherein the control circuit refreshes a gradation signal held in a liquid crystal element of a display panel at predetermined intervals by repeating an operation of stopping an output of still image data from the output interface circuit by changing the control command to a first state and then resume a supply of the still image data by changing the control command to a second state at the predetermined intervals.

* * * * *